United States Patent [19]

Fousse

[11] Patent Number: 5,925,417

[45] Date of Patent: Jul. 20, 1999

[54] SURFACE TREATMENT OF METAL SHEET

[75] Inventor: Daniel Fousse, Plappeville, France

[73] Assignee: Sollac, Puteaux, France

[21] Appl. No.: 08/845,834

[22] Filed: Apr. 28, 1997

[30] Foreign Application Priority Data

Apr. 26, 1996 [FR] France ................................. 96 05267

[51] Int. Cl.⁶ ................................. B05D 1/38; B05D 3/02
[52] U.S. Cl. ........................ 427/352; 427/409; 427/388.2; 428/457
[58] Field of Search ................................. 427/409, 352, 427/388.2; 428/457

[56] References Cited

U.S. PATENT DOCUMENTS

| | | |
|---|---|---|
| 3,284,248 | 11/1966 | Rumberger . |
| 3,644,566 | 2/1972 | Kincheloe et al. . |
| 5,103,550 | 4/1992 | Wefers et al. ........................ 29/527.4 |
| 5,409,739 | 4/1995 | Lin et al. ................................. 427/512 |
| 5,435,839 | 7/1995 | Ogawa ..................................... 106/10 |
| 5,650,097 | 7/1997 | Wysong et al. ......................... 252/392 |

FOREIGN PATENT DOCUMENTS

| | | |
|---|---|---|
| 0 003 071 | 7/1979 | European Pat. Off. . |
| 0 159 894 | 9/1984 | European Pat. Off. . |
| 0 275 051 | 7/1988 | European Pat. Off. . |
| 0 466 044 | 1/1992 | European Pat. Off. . |
| 0 484 886 | 5/1992 | European Pat. Off. . |
| 0 511 548 | 11/1992 | European Pat. Off. . |
| 533606 | 3/1993 | European Pat. Off. . |
| 1395228 | 4/1965 | France . |
| 2 166 404 | 4/1973 | France . |
| WO 93/07191 | 4/1993 | WIPO . |

OTHER PUBLICATIONS

Translation of FR 1395228, Mar. 1965.
Stahl Und Eisen, vol. 113, No. 5, May 17, 1993, Dusseldorf DE, pp. 101–107, 157,XP000365135, Stratamann M: "Struktur Und Stabilitaet Chemisch Modifizierter Stahloberflaechen Zur Verbesserung Der Haftung".

*Primary Examiner*—Erma Cameron
*Attorney, Agent, or Firm*—Oblon, Spivak, McClelland, Maier & Neustadt, P.C.

[57] ABSTRACT

A treatment process for metal in which there is applied to a metal surface a film of an organic product, the film is heated to a suitable temperature for a suitable time so that all or a portion of the product becomes fixed on the metal surface and the organic product becomes partly cross-linked on the surface. Applications to corrosion protection, to lubrication and to preparation for coating, especially varnishing sheets.

18 Claims, 1 Drawing Sheet

SURFACE TREATMENT OF METAL SHEET

BACKGROUND OF THE INVENTION

1. Field of the Invention

The invention relates to a surface treatment of metal products, preferably sheets, especially of bare steel products or steel products coated with a metal plating. The treated metal products also make up part of the invention as does their use.

2. Discussion of the Background

Surface treatments are known in at least three general areas: those that are used to prepare a metal surface for the deposition of a coat (such as chromating), to protect against corrosion (such as oiling) and to lubricate the surface for forming or deep-drawing operations (also such as oiling).

The first area is that of preparation of a surface for deposition of a coating.

To make food packagings, there are currently used tin-plated sheets (tin- plate) coated with a layer of protective varnish. Application of the protective varnish necessitates preliminary treatment of the metal surface, in particular to achieve good adherence of the varnish to the surface under conditions that include aqueous, solvent or corrosive environments. This preliminary treatment of the metal surface currently consists of a passivation treatment of the chemical or electrochemical chromating type. The use of such treatments generally involves risks of corrosion and pollution related to chromium, especially during handling of treatment solutions and disposal of treatment effluents.

U.S. Pat. No. 5,103,550 describes a process for the application of varnish on the surface of an aluminum metal sheet wherein:

there is performed a preliminary surface treatment consisting of:
  a) anodizing the said surface to form an oxidized surface,
  b) applying a homogeneous film of organic product based on phosphonic or phosphinic acids or esters or on salts thereof, which substances may or may not be polymerized,
  c) then eliminating from the said film, by rinsing and if necessary drying the said film, that quantity of organic product which is not fixed to the said surface, if necessary, by means of a solvent for the said organic product, and there is immediately applied to the treated surface a varnish, for example a modified epoxy polyvinyl chloride varnish of the type commonly used in the area of sheets for foodstuff packaging.

The surface treatment described in this document advantageously replaces a chromating treatment for promoting adherence of the varnish to the sheet. However, this surface treatment necessitates a preliminary anodization stage, which complicates the process; in addition, this stage is not necessarily feasible for other types of substrates, such as on steel sheets coated with a metallic plating, for example tin-plated, chrome-plated or zinc-plated steel sheets. In addition, this surface treatment necessitates immediate application of the varnish, since the treated surface cannot retain its properties that favor adherence of the varnish. Such a surface treatment therefore does not permit plans to store the treated sheets, which is a serious drawback.

Document EP 484,886 describes a process for application of a fluorocarbon polymer on the surface of a metal sheet, especially of aluminum, wherein:

the surface is treated by application of a homogeneous monomolecular layer of an organic product (or "coupling agent") based on molecules, the main skeleton of which has the form of a linear carbon chain, containing a polar siloxane radical at one end only, the said fluorocarbon polymer is applied immediately, then the polymer is made to react on the said film and the polymer is made to undergo cross-linking, especially by irradiation.

According to this document, the reaction that induces adherence between the film of coupling agent and the applied polymer layer assumes C=C or C≡C bonds, especially in the linear carbon chain at the end opposite from that of the siloxane radical. Thus the drawback of such a process is that it necessitates application of an exclusively monomolecular film of coupling agent, which is sometimes difficult to achieve by simple methods. Another drawback of such a process is that it necessitates a reaction stage, for example by means of irradiation, to make the polymer layer react with and adhere to the surface-treatment film. A further drawback of such a process is that a treated surface cannot be stored without losing its "coupling" properties, since the C=C or C≡C bonds become progressively oxidized, especially due to natural exposure to ultraviolet radiation.

The second and third areas are those of corrosion protection and lubrication for forming, especially deep-drawing.

On discharge from fabrication, sheets are generally oiled to provide corrosion protection at least temporarily, or in other words for at least a storage period (at least one day, and sometimes even several months).

The oils used for such protection must also be adapted to facilitate forming, without prior degreasing, immediately on removal from storage.

Oils commonly used for such applications are, for example, based on dioctyl sebacate or acetyl tributyl citrate.

Thus sheets to be coated are generally oiled when removed from storage, and so it is advisable to degrease them first of all. This means that at least three operations—oiling, degreasing, chromating—can be identified between discharge of the sheets from fabrication and admission to the coating installation (varnishing or painting, for example).

In addition, despite the degreasing operation prior to the coating process, "varnish-repelling effects" are frequently observed during application of the varnish, thus leading to the presence of zones not covered by the varnish on the sheet surface.

These varnish-repelling effects generally result from defects and difficulties during degreasing, and may lead to high reject ratios.

OBJECTS OF THE INVENTION

One object of the invention is to provide a surface treatment for metal sheets that is applicable for corrosion protection and lubrication on the one hand, and for preparation for coating while limiting the varnish-repelling effects on the other hand.

Another object of the invention is the provision and use of surface-treated sheets.

SUMMARY OF THE INVENTION

The above objects of the invention are provided by a surface treatment process for metal products such as sheets, characterized in that:

there is applied to the surface of a metal product a film of an organic product based on molecules, the main skeleton of which has the form of an apolar linear chain consisting of saturated carbon-carbon bonds at one end and containing a polar radical at the other end only, the film is heated to a suitable temperature for a suitable time so that all or a portion of the organic product becomes fixed on the metal surface and/or the organic product becomes partly cross-linked on the metal surface, and that, optionally, any quantity of organic product which is not fixed and/or cross-linked to the said surface is then eliminated from the film, if necessary, by, e.g., using a solvent for the organic product.

According to preferred embodiments, application and heating of the film may be carried out successively or simultaneously.

The invention process may also include one or more of the following characteristics:

the conditions for application and heating of the said film are adapted such that, after treatment, the proportion of the polar radicals on the film surface is higher than the stoichiometric proportion of these radicals in the molecules of the said organic product.

the polar radical is chosen from among at least the following radicals: carboxylic acid, phenol, epoxy, vinyl, amine or silane.

Another object of the invention is to provide a bare or metal-plated steel sheet that is coated on its external surface with a crosslinked and fixed film of the organic product referred to above, preferably a coated sheet resulting from the surface treatment of sheets according to the invention process described above.

The invention can also have one or more of the following characteristics:

the thickness of the film comprises at least two monomolecular layers of the said organic product.

the film is homogeneous.

in the case of a metal-plated steel sheet, the metal plating comprises or consists of zinc, zinc alloy, chromium or chromium alloy, tin or tin alloy.

The invention also includes a process for application of varnish on the surface of a bare or metal-plated steel sheet, wherein:

in a first stage, the metal surface is treated according to the invention method set out above (film of organic product, etc.), then, in a second stage, the varnish is applied directly on the treated metal surface.

This aspect of the invention can also have one or more of the following characteristics:

the period between the first stage and the second stage is longer than 1 day.

the varnish is of the polar type.

Another object of the invention is the use of a steel sheet surface treated, and surface treated and varnished, according to the invention for fabrication of packaging for, e.g., liquid or solid foodstuffs, etc.

The invention applies to all metal products, regardless of their shape. For simplicity, metal sheets will be discussed hereinafter, but any shape may be used. Any type of steel can make up the product, sheet, etc.

Another aspect of the invention is a process for forming a bare or metal-plated steel sheet by means of a forming tool, wherein:

in a first stage, at least that surface of the sheet which will come into contact with the forming tool is surface treated according to one or more of the processes of the invention, and, in a second stage, the actual forming process is carried out by means of the said tool.

This aspect of the invention can also have the characteristic according to which the period between the said first stage and the said second stage is longer than 1 day.

DETAILED DESCRIPTION OF THE INVENTION

The invention will be better understood by reading the description hereinafter, provided by way of non-limitative example and with reference to FIG. 1.

Figure 1:
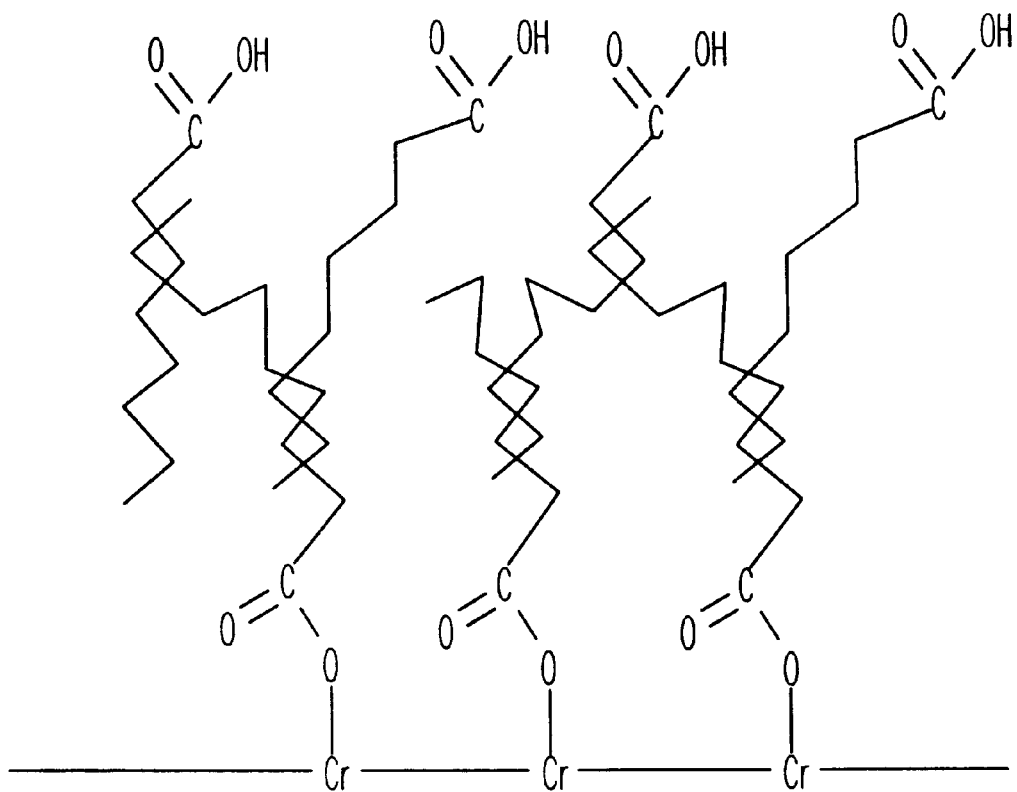
FIG. 1 schematically illustrates a typical structure of a treatment according to the invention of a chromated steel sheet by a fatty acid.

The metal product, preferably in the form of a sheet, the surface of which is to be treated, is, for example, a bare or tin-plated, (tin-plate) chrome-plated or zinc-plated steel product (sheet).

A film, preferably a homogeneous film, of organic product is applied on the surface by, e.g., any method such as immersion, coating or electrostatic oiling.

Preferably the organic product is an organic compound, the main skeleton of which has the form of an apolar linear carbon chain, containing a polar radical at one end only. Preferably, the polar radical is chosen from among at least the following radicals: carboxylic acid, phenol, epoxy, vinyl, amine or silane.

Preferably, the number of carbon atoms in the linear chain of the main skeleton is sufficiently small that the product can be applied readily in the liquid state and sufficiently large that the product does not evaporate rapidly during heating of the film applied to the surface. Thus the number of successive carbon atoms in the linear chain is preferably larger than or equal to 8, preferably up to and including 24. This range includes 10, 12, 14, 16, 18, 20 and 22 carbons.

According to the invention, the linear chain of the main skeleton preferably does not contain polar substituents or branches, and the terminal C—C bond of the chain on the side opposite the end containing a polar radical is preferably saturated. This provision excludes, for example, the use of perfluorocarboxylic or perchlorocarboxylic acid, because the fluorine or chlorine atoms grafted onto the skeleton of the molecule of such compounds would prevent or limit adherence of a varnish applied subsequently to the treated surface, which is contrary to the goal of the invention.

This provision also excludes, for example, carbon chains containing alkoxy functions other than at the end corresponding to the polar radical, since such alkoxy functions give the carbon chain itself a polar character, thus making it difficult to put the invention into practice.

Thus, among the organic compounds products) that are usable for putting the invention into practice, there can be cited oleic acid, palmitic acid, epoxyoctane, etc. In addition, the organic compounds of FR 1,395,228, incorporated herein by reference, can also be used herein. A preferred general formula describing compounds useful herein is R—X where R is a $C_6$–$C_{24}$, preferably $C_8$–$C_{22}$ linear saturated or internally unsaturated alkyl group and X is a polar group, such as

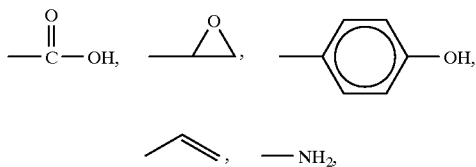

silane, etc.

During application of the organic product on the metal surface, it is thought that the molecules of the product tend to reconform spontaneously into aggregates such as layers, micelles, balls, etc. thus minimizing their surface energy. To facilitate application on the surface to be treated, this product can be diluted in a solvent.

If a polar solvent is used, the polar radicals will become positioned at the outside of the "balls", whereas, in the absence of a solvent or if an apolar solvent is used, the apolar linear carbon chains will be turned toward the outside of the "balls". After application of the product, there is obtained a sheet, the surface of which to be treated is coated with a film of the product.

The sheet coated with a film of organic product is then heated to a suitable temperature for a suitable time to make the product react with the metal surface and to make it react with itself, meaning that a portion of the product becomes fixed on the surface to be treated and a portion of the product becomes partly cross-linked therewith through physical entanglement, Van der Wal's forces, etc. Bilayers and multilayers of the organic product on the metal surface are preferred. Accordingly, polar groups are preferably located at the metal surface and at the outer surface of a bilayer only. If a multilayer structure is prepared some polar groups may be located at the layer boundaries.

The heating process also has the purpose of loosening the "balls" of molecules in such a way that the polar radicals become turned toward the outside of the film, toward the metal surface or toward the external surface of the film, and thus in such a way that the linear carbon chains remain interlocked in the thickness of the film. If a solvent is used for application, the heating process is also adapted to evaporate this solvent.

When oleic acid is used, it is possible, for example, to apply heating at about 200° C. for about 5 seconds or at about 140° C. for about 5 minutes. Preferably, this temperature is at least equal to 120° C. Preferably, this temperature is about 10 to 60° C. lower than the boiling point or decomposition temperature of the organic product. The heating time can vary from 1 second to as long as necessary, including 10 minutes, to provide a stable film. Such variation is within the skill of the ordinary artisan.

According to one embodiment of the invention, the organic product is applied while being made to react and undergo cross-linking in the same operation, for example by immersing the sheet in a bath of said product; the bath temperature and the immersion duration are then adapted as in the foregoing to achieve fixation and cross-linking of all or a portion of the product on the surface to be treated.

According to another embodiment of the invention, the organic product can even be applied on a hot, preheated sheet.

In this way there is obtained a sheet coated with a film of product, at least part of which has been fixed and/or cross-linked to the surface.

It is therefore seen that the polar radicals are particularly important for binding and fixation to the surface to be treated, and that the apolar linear chains are particularly important for obtaining cross-linking of a portion of the product in the film applied to the surface.

The molecules of organic product of the applied film are considered to be fixed or cross-linked to the surface when they are bound to the surface either by a polar terminal function of a molecule, or indirectly when they are overlapped, interlocked or cross-linked in another product molecule directly bound to the surface.

It is preferred that the application conditions be adapted to apply a sufficient quantity of organic product corresponding to a plurality of monomolecular layers.

The conditions of heating of the applied film preferably permit overlapping of at least two monomolecular layers by means of interlocked apolar chains.

The application and heating conditions can be checked by surface analysis as described hereinafter.

If any portion of organic product does not become fixed and/or cross-linked to the surface during heating, it is then preferably eliminated from the applied film; this portion that is not fixed and/or cross-linked, in other words the "free" portion, may be considered as being in the liquid state.

To eliminate the "free" portion of the film of organic product, it is sufficient, for example, to rinse the sheet in a solvent for the product. Preferably the rinse solvent has a polar character, and the sheet may be dried after being rinsed.

There is therefore obtained a sheet coated on the external surface with a film of the said organic product, which is cross-linked and which adheres to the sheet, this film preferably comprising at least two monomolecular layers of the organic product.

By means of surface analysis (such as photoelectron spectroscopy or "XPS"), it is possible to measure the surface density of the ends of the molecules of the organic compound on the external surface of the film fixed and cross-linked to the metal surface to be treated.

One means of checking the conditions of application (sufficient quantity of product) and heating (suitable crosslinking, orientation, etc. of the molecules) consists in verifying, by these analysis means, that the proportion of polar radicals on the surface of the treatment film is larger than the stoichiometric proportion of these radicals in the molecules of the organic surface-treatment product. Preferably, after treatment (i.e., application of organic product, heating and optional removal of free portion) the proportion of polar groups at the film outer surface (and not at the metal-film interface) is greater than the proportion of these groups in the organic product (the average and general proportion of polar groups in a volume or quantity of organic product).

For example, when the applied organic product is a carboxylic acid, an elevated level of carboxylates is then detected at the surface of the sheet; thus an elevated proportion of COOH radicals is measured at the surface; in the case of oleic acid, a 10% or greater excess proportion of COOH radicals at the surface of the treatment film is regarded as a sign of satisfactory surface treatment.

If the treatment is not satisfactory, the treatment can be repeated on the surface that has already been treated for the first time, and/or the application and/or heating conditions can be modified for subsequent treatments.

The treatment according to the invention therefore coats the metal surface with a very thin film, of thickness corresponding to only a few molecules of the product used.

This very thin film is sufficiently cross-linked that it resists water and solvents.

This treatment film is strongly bound to the metal surface.

This treatment film has a polar external surface, as illustrated by FIG. 1, which represents a treatment film according to the invention applied on a chrome-plated steel surface, the organic product used for the treatment being a fatty acid in this case.

The advantages of the treatment according to the invention result from the properties of this film.

In the first place, after the treatment according to the invention, it is possible directly to apply a coat such as varnish or paint; the coats applied to surfaces treated according to the invention adhere at least as well as coats applied to the same surfaces treated by chromating according to the prior art.

The treatment according to the invention is therefore an advantageous substitute for chromating treatments; in contrast to chromating treatments, it is a treatment without pollution and/or corrosion risks, and its effluents are easier to treat.

The treatment according to the invention is therefore related to a surface-passivation treatment.

In the second place, it is seen that the treatment according to the invention can be a substitute for protective and/or lubricating oiling.

On the one hand, by treating sheets in the manner according to the invention, advantages are observed as regards their corrosion resistance and applicability of a coat.

As regards corrosion resistance, the treatment according to the invention imparts, by itself, better corrosion protection than is achieved by oiling of sheets, even if they have been passivated.

As regards applicability of a coat, varnish, for example, can be applied much more easily to a sheet treated according to the invention than to a sheet oiled for storage and then degreased: in fact, not only is a degreasing operation prior to varnish application avoided, but also varnish-repelling effects after application of the varnish are no longer observed.

This disappearance of varnish-repelling effects is observed whether or not the surface treated according to the invention had previously been oiled.

On the other hand, it is seen that the treatment according to the invention improves the tribological properties of the surface just as would occur by means of classical oiling.

Thus sheets treated according to the invention are protected from corrosion for a storage period of between one day and several months and, after storage, they remain directly usable both for a forming operation and for a coating operation, especially of the varnish type, without other intermediate operations of degreasing and surface treatment (chromating type).

The treatment according to the invention is therefore particularly advantageous at the output of the sheet-fabrication line, where it can be applied in preparation for storage regardless of the destination of the sheet.

Between discharge of the sheet from fabrication and admission to a coating installation, the oiling-degreasing-chromating sequence can then be advantageously replaced by a single surface-treatment operation according to the invention.

The treatment according to the invention therefore permits simplification of the process engineering at the output of a sheet-fabrication line, just as it permits simplification of the sheet-coating process, especially with varnishes.

In the cases of varnishing or painting of sheets, it is not at all necessary—since the treatment according to the invention is at the same time an adhesion-imparting, passivation and protective treatment—to apply the varnish or paint immediately after the surface treatment, in contrast to the process described in document U.S. Pat. No. 5,103,550.

In fact, a period of intermediate storage lasting, for example, longer than one day between the surface treatment and application of the varnish or paint does not pose any problem of loss of adhesion capability or risk of corrosion in the present invention.

A large number of organic products that are usable for putting the invention into practice are compatible with foodstuff applications, especially the fatty acids, without toxicological risks or even risks of pollution by the effluents, thus making the process advantageous for preparing sheets for foodstuffs packaging.

Finally, it is seen that the layer deposited on the surface of the sheet according to the invention is resistant to solvents, or in other words that the sheet treated according to the invention is not easily "degreasable".

Thus, even after being rinsed in solvents, the sheet treated according to the invention retains its corrosion protection and also its tribological properties.

The treatment according to the invention can therefore be a substitute for operations other than oiling sheets; for example, it can replace external varnishing of metal packaging for foodstuffs; it can be used to protect and lubricate the external bottoms of stackable metal boxes.

In addition, it proves to be difficult to make a polyolefin film such as polyethylene adhere to a sheet treated according to the invention; this characteristic clearly differentiates the treatment according to the invention from already known treatments in which, moreover, a monomolecular layer of organic products analogous to those of the invention is applied to a sheet for the purpose of preparing for bonding of a polyolefin film, as described in document FR 1,395,228.

In these treatments of preparation for bonding, the temperature to which the product is subjected during or after application is always lower than that used in the invention.

For a further description of the invention, reference will now be made to the following examples:

EXAMPLE 1

The purpose of this example is to illustrate an embodiment of the invention in which a film of organic product is applied and heated simultaneously.

The objective is to treat a tin-plated sheet by the method according to the invention.

This sheet to be treated is immersed in a bath of hot oleic acid: either for about 5 seconds at about 200° C. or for about 5 minutes at about 140° C.

After this immersion, a sheet coated with a film of oleic acid is obtained.

The major portion of the oleic acid of the surface film covering the sheet is in liquid form, but part of the oleic acid has become fixed and cross-linked to the surface during immersion.

The sheet is then rinsed in an agitated bath of acetone for about one minute in order to eliminate that portion of the applied film which is not fixed and/or cross-linked.

After rinsing (and drying), a sheet treated according to the invention is then obtained.

To check the treatment according to the invention, it can be verified by photoelectron spectroscopy ("XPS") that the excess proportion of COOH radicals is greater than or equal to 10% on the treated surface; if the proportion of carboxylate radicals is insufficient, then, according to the invention, the applied film must be heated for a longer time and/or at a higher temperature during the treatment.

EXAMPLE 2

The purpose of this example is to illustrate an embodiment of the invention in which the treatment product is applied then heated.

By means of a roughened rod coated with oleic acid, a thin film of oleic acid is applied without heating to the surface of a sheet to be treated.

After this application, there is obtained a sheet coated with a film of oleic acid, which is substantially in liquid form, or in other words not fixed and not cross-linked.

At this stage of the process, this film could easily be eliminated by rinsing in a solvent.

The sheet to be treated is then heated for about 5 minutes at a temperature of about 180° C.

A sheet treated according to the invention is then obtained.

In this embodiment of the invention, rinsing in a solvent is not necessary, because the applied film is already very thin and most of the applied oleic acid has been able to become fixed and/or cross-linked during heating.

EXAMPLE 3

The purpose of this example is to illustrate that the surface treatment according to the invention can be performed on an oiled sheet without having to degrease the sheet beforehand.

The objective is to treat a tin-plated, greasy and oily sheet by the method according to the invention; a layer of oil, with a density of 0.5 g/m$^2$, for example, therefore was deposited on the sheet to ensure temporary corrosion protection.

The same procedure as in Example 1 is then followed, with the difference that the duration of immersion in hot oleic acid is lengthened in order to permit desorption of the oily layer in the oleic acid.

Since the oil layer present on the surface of the sheet is soluble in oleic acid, immersion in oleic acid serves the double purpose of cleaning the surface of the sheet and coating it with oleic acid.

After rinsing (and drying), a sheet treated according to the invention is then obtained.

By virtue of the invention, therefore, it is not necessary to carry out degreasing when the objective is to treat greasy sheets by the method according to the invention.

EXAMPLE 4

The purpose of this example is to illustrate the corrosion protection imparted by treatments according to the invention.

To evaluate the corrosion resistance of a treated sheet, a procedure known in itself is followed in which specimens to be tested are subjected to corrosion cycles under controlled atmospheres (climate chambers); the corrosion test consists in evaluating the number of cycles (1 to 20) necessary on the one hand to see rust appear and on the other hand to observe complete rusting of the specimen.

Two types of specimens are used in this test:

a tin-plated reference specimen passivated and oiled according to the prior art, a specimen according to Example 1, directly treated with oleic acid.

The results are presented in Table I (atmospheric corrosion tests).

TABLE 1

Atmospheric corrosion tests

| Specimen | Number of cycles necessary for: | |
|---|---|---|
| | Appearance of Rust | Complete Resting |
| Reference | 4 | 7 |
| Treated with oleic acid | >20 | >20 |

It is therefore seen that the treatment according to the invention imparts corrosion resistance superior to that of the treatments, such as oiling, currently being used for temporary protection.

EXAMPLE 5

The purpose of this example is to illustrate the advantage that the invention provides for preparing a metal surface for a coat, especially of varnish.

The essential objective sought by the application of varnish on a sheet is to impart very high resistance to corrosion, especially water corrosion.

To evaluate the resistance to corrosion—in this case water corrosion—of varnished specimens to be tested, those specimens are subjected to a standard corrosion test and then their corrosion level is measured.

The standard corrosion test consists in immersing the specimens in an aqueous solution containing 50 g/liter of citric acid, keeping them in this solution for one hour at boiling and then for seven days at room temperature.

To measure the corrosion level, the width (especially around the edges) over which the varnish may have been separated from the sheet is evaluated first and the density of any "blush" on the varnished surface is evaluated second (a large portion of surface—in %—covered with "blush" indicates poor corrosion resistance).

"Blush" is the term used for whitish films that may appear on a varnished surface, for example on the internal surface of metal packaging, after sterilization of the foodstuffs that it contains; these "blush" films result, for example, from partial and/or localized hydrolysis of metal-varnish bonds and/or from localized separations of the varnish.

According to this procedure, the corrosion resistance of a plurality of specimens coated with the same protective varnish is evaluated:

one reference specimen ("ref. 1"), consisting of black plate varnished without surface preparation;

another reference specimen ("ref. 2"), consisting of black plate varnished after surface preparation by the prior art, or in other words after chromating;

one specimen according to the invention ("inv."), consisting of black plate varnished after surface treatment according to the invention, using oleic acid as in example 1. The results are reported in Table II (water corrosion tests - varnished black plate).

TABLE II

Water corrosion tests-varnished black plate

| Observations<br>Specimen . . . | . . . of the edges<br>width of separation | . . . of the surface<br>blush density |
|---|---|---|
| Ref. 1: untreated and varnished | 10 to 15 mm | generalized<br>(40% of surface) |
| Ref. 2: treated and varnished | 2 to 4 mm | none (approx.<br>0% of surface) |
| Inv.: treated and varnished | 2 to 4 mm | limited<br>(20% of surface) |

Using the same procedure, the corrosion resistance of a plurality of varnished specimens made from tin-plated iron instead of black plate is evaluated.

The results are reported in Table III (water corrosion tests - varnished tin-plate).

TABLE III

Water corrosion tests - varnished tin-plate

| Observations<br>Specimen . . . | . . . of the edges<br>width of separation | . . . of the surface<br>blush density |
|---|---|---|
| Ref. 1: untreated and varnished | 5 to 6 mm | not measured |
| Ref. 2: treated and varnished | about 4 mm | none (approx.<br>0% of surface) |
| Inv.: treated and varnished | about 2 mm | none (approx.<br>0% of surface) |

It is therefore seen that the surface treatment according to the invention substantially improves the corrosion protection imparted by a layer of varnish on this surface (this improvement may still be poorer than that achieved by chromating), while avoiding the drawbacks, especially of pollution and corrosion, associated with the use of chromating solutions.

EXAMPLE 6

The purpose of this example is also to illustrate the advantage that the invention provides for preparing for application of a varnish.

Specimens of tin-plate, chrome-plate and black-plate are subjected to surface preparation by chromating as in the prior art on the one hand or according to the invention on the other hand, and are then coated with two classical epoxyphenolic varnishes in industrial varnishing installations.

Tests of adherence of the varnish layer and of deep-drawing capability of the varnished specimens give satisfactory and comparable results regardless of the solution used.

During application of the varnish, however, varnish-repelling effects are not observed in the case of specimens treated according to the invention, contrary to the case of specimens treated by chromating according to the prior art.

The treatment according to the invention simplifies the surface-preparation operations (no risks of pollution and/or of chromium corrosion) and improves or at least maintains the varnishability of metal surfaces (no risks of varnish-repelling effects).

EXAMPLE 7

The purpose of this example is to illustrate the lubricating properties imparted by the treatment according to the invention.

The friction coefficient of different specimens of tin-plate is measured by the "ALTEK" method.

In this method, a weight of three kilograms is placed on the surface to be treated, where it rests on three hemispherical feet, and the force necessary to make the weight slide over the surface is measured; the force-to-weight ratio gives the friction coefficient.

The results obtained are presented in Table IV (sliding tests).

TABLE IV

Sliding tests

| Specimen | Oiled | Treated According to the invention, not degreased | Treated according to the invention, degreased with acetone | Varnished |
|---|---|---|---|---|
| Coeff. of friction | >0.25 | 0.158 | 0.143 | 0.05 to 0.10 |

The treatment according to the invention improves the tribological properties of the surface without necessarily reaching the level of lubrication imparted by classical oiling of the prior art or, a fortiori, that imparted by a layer of varnish.

EXAMPLE 8

The purpose of this example is to illustrate the use of the invention by means of surface-treatment products other than oleic acid.

Following the same procedure as in Example 1 for specimens of tin-plate sheet, the surface of these specimens is treated with different types of organic products, then the same layer of varnish is deposited on these specimens.

During preparation of these specimens, application tests are performed:

"treatability" test of the surface treatment prior to varnishing: treatability is regarded as easy if the treatment product is easy to apply.

corrosion test: after the treatment but before varnishing, the number of cycles to obtain either appearance of rust ("appearance") or complete rusting ("complete") is measured by the same procedure as in Example 4.

varnishability test (see Example 6) during the varnishing operation: varnishability is regarded as "good" when varnish-repelling effects are absent and good adherence of the varnish to the treated surface is obtained.

A reference specimen is also prepared by adding degreasing, chromating and varnishing operations to the preparation of the reference specimen of Example 4.

The results obtained are presented in Table V (treatment products according to the invention).

The value of "C" in parentheses indicated after each treatment product corresponds to the number of carbon atoms in the apolar linear chain of the product, without regard to the carbon atoms grafted onto the chain or those of the terminal polar radical of the product.

TABLE V

Treatment products according to the invention

| Application Test: Applicability | | Corrosion/ rusting | Varnishability | |
|---|---|---|---|---|
| Treatment product | | Appearance | Complete | |
| Oleic acid (C = 17) | easy | >20 | >20 | good |
| Palmitic acid (C = 15) | difficult | >20 | >20 | good |
| Epoxyoctane | easy | 6 | 14 | good |
| Reference (see Ex. 4) | (not relevant) | 4 | 7 | good |

In comparing the specimens between discharge of a sheet from fabrication (in this case coated with a plating of tin metal) and its entry into a coating line (in this case varnishing), the operations are:

for the reference specimen: oiling, degreasing, chromating, i.e., three operations.

for the specimens according to the invention: only one surface-treatment operation according to the invention, since the same treatment is effective for protecting against corrosion and at the same time for preparing a coating.

Thus, by virtue of the invention, the operations of preparation of coated sheets, especially varnished or painted sheets, are considerably simplified.

French patent application 96 05267 filed Apr. 26, 1996, now FR 2747945 is incorporated herein by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the surface treatment of metal, comprising the steps of:

applying to a metal surface a film comprising at least one organic compound of the formula R—X where R is a $C_6$–$C_{24}$ linear saturated or internally unsaturated alkyl chain and X is a polar group, heating the film to obtain a bi- or multi-layer film, wherein a first layer of the organic compound in the film is chemically bonded to or physically adsorbed on the metal surface and the alkyl chains of a second layer of the organic compound are cross-linked with the alkyl chains of the first layer, optionally removing any organic compound which is not chemically bonded, physically adsorbed or cross-linked, wherein the film comprises an outermost layer having polar groups.

2. A process according to claim 1, wherein a proportion of the polar groups at the outermost layer is greater than an average and general proportion of the polar groups in a volume of the organic compound as measured by X-ray photoelectron spectroscopy.

3. A process according to claim 1, wherein the said polar group is selected from the group consisting of the following radicals: carboxylic acid, phenol, epoxy, vinyl, amine and silane.

4. A bare or metal-plated steel sheet coated on its external surface with a cross-linked film resulting from surface treatment of said sheet according to the process of claim 1.

5. A sheet according to claim 4, wherein the thickness of the film corresponds to the thickness of at least two monomolecular layers of the organic compound.

6. A steel sheet coated with a metal plating according to claim 4, wherein the metal plating consists of zinc, zinc alloy, tin, tin alloy, chromium or chromium alloy.

7. A process for application of varnish on the surface of a bare or metal-plated steel sheet, wherein:

in a first stage, a surface of the metal sheet is treated according to the process of claim 1, in a second stage the varnish is applied directly on the treated surface.

8. A process according to claim 7, wherein the period between the said first stage and the said second stage is longer than 1 day.

9. A process according to claim 7, wherein the varnish is a polar varnish.

10. Packaging for liquid or solid foodstuffs comprising the sheet of claim 4.

11. A process for forming a bare or metal-plated steel sheet by means of a forming tool, wherein:

in a first stage, a surface of the sheet which comes into contact with the said forming tool is treated according to the process of claim 1, in a second stage, the forming process is carried out by means of the tool.

12. A process according to claim 11, wherein the period between the said first stage and the said second stage is longer than 1 day.

13. The process according to claim 1, wherein said heating is to a temperature of 10–60° C. lower than a boiling point or a decomposition temperature of said organic compound.

14. The process according to claim 13, wherein said temperature is $\geq 120°$ C.

15. The process according to claim 14, wherein said temperature is 120–200° C.

16. The process according to claim 1, wherein said heating is for a time $\geq 1$ second.

17. The process according to claim 16, wherein said heating is for a time of 5 seconds to 10 minutes.

18. The process according to claim 2, wherein said polar group is a carboxylic acid, and said proportion of the polar groups at the outermost layer is equal to 10% or greater in excess of the average and general proportion of the polar groups in a volume of the organic compound as measured by X-ray photoelectron spectroscopy.

* * * * *